United States Patent
Van Driessche

(10) Patent No.: US 6,801,497 B1
(45) Date of Patent: Oct. 5, 2004

(54) METHOD TO PROVIDE A MANAGEMENT CHANNEL, A LINE TERMINATOR, A FIRST NETWORK TERMINATOR CARD AND A SECOND NETWORK TERMINATOR CARD REALIZING SUCH A METHOD AND AN ACCESS NETWORK

(75) Inventor: Rafael Van Driessche, Ledeberg (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/252,455

(22) Filed: Feb. 18, 1999

(30) Foreign Application Priority Data

Feb. 19, 1998 (EP) .............................. 98400409

(51) Int. Cl.[7] .............................. G06F 11/00; G02F 1/00
(52) U.S. Cl. ...................... 370/225; 370/241.1; 398/5
(58) Field of Search ................................ 370/433, 437, 370/443, 216–228, 241–249; 714/1, 2, 4, 44, 47; 340/825.01, 825.02, 2.1, 2.23, 3.1, 3.43; 709/239; 359/161, 137, 153; 398/17, 10, 1, 2, 3–5

(56) References Cited

U.S. PATENT DOCUMENTS

| | | | | |
|---|---|---|---|---|
| 5,226,037 A | * | 7/1993 | Satomi et al. | 340/825.01 |
| 5,329,521 A | * | 7/1994 | Walsh et al. | 714/4 |
| 5,539,564 A | * | 7/1996 | Kumozaki et al. | 359/161 |
| 5,661,719 A | | 8/1997 | Townsend et al. | |
| 5,859,895 A | * | 1/1999 | Pomp et al. | 370/217 |
| 5,959,972 A | * | 9/1999 | Hamami | 370/228 |
| 5,974,562 A | * | 10/1999 | Townsend et al. | 709/218 |
| 6,023,467 A | * | 2/2000 | Abdelhamid et al. | 370/395 |
| 6,181,680 B1 | * | 1/2001 | Nagata et al. | 370/248 |

FOREIGN PATENT DOCUMENTS

EP     0 701 384 A2     3/1996

OTHER PUBLICATIONS

Y. Okumura et al, "Duplex System Configuration in Passive Double Star System", Proceedings to the Global Telecommunications Conference (Globecom), and San Francisco, Nov. 28–Dec. 2, 1994, vol. 3, Nov. 28, 1994, pp. 1930–1934.
ITALEL, "Management of (Optical) Network Terminations", pp. 1–10, Dec. 3, 1997.

* cited by examiner

*Primary Examiner*—Steven Nguyen
(74) *Attorney, Agent, or Firm*—Sughrue Mion, PLLC

(57) ABSTRACT

A method is described to provide a management channel for use in a tree like access network including the cascade connection of one common link (L) and dedicated links (L1, L2, L3). The access network includes a line terminator (LT) and a network unit (NU). The method includes the step of determining by the line terminator (LT) a network unit management channel (CH-NU) for a first network terminator card (NTC1) included in the network unit (NU) and coupled to the line terminator (LT) via the common link (L) and a first one of the dedicated links (L2) in order to transport management information from the first network terminator card (NTC1) to the line terminator (LT).

A second network terminator card (NTC2) is included in the network unit (NU) and is coupled to the line terminator (LT) via the common link (L) and a second one of the dedicated links (L3). In the event when the second network terminator card (NTC2) which is stand-by for the first network terminator card (NTC1) becomes active, the same network unit management channel (CH-NU) is used in order to transport the management information from the second network terminator card (NTC2) to the line terminator (LT).

22 Claims, 1 Drawing Sheet

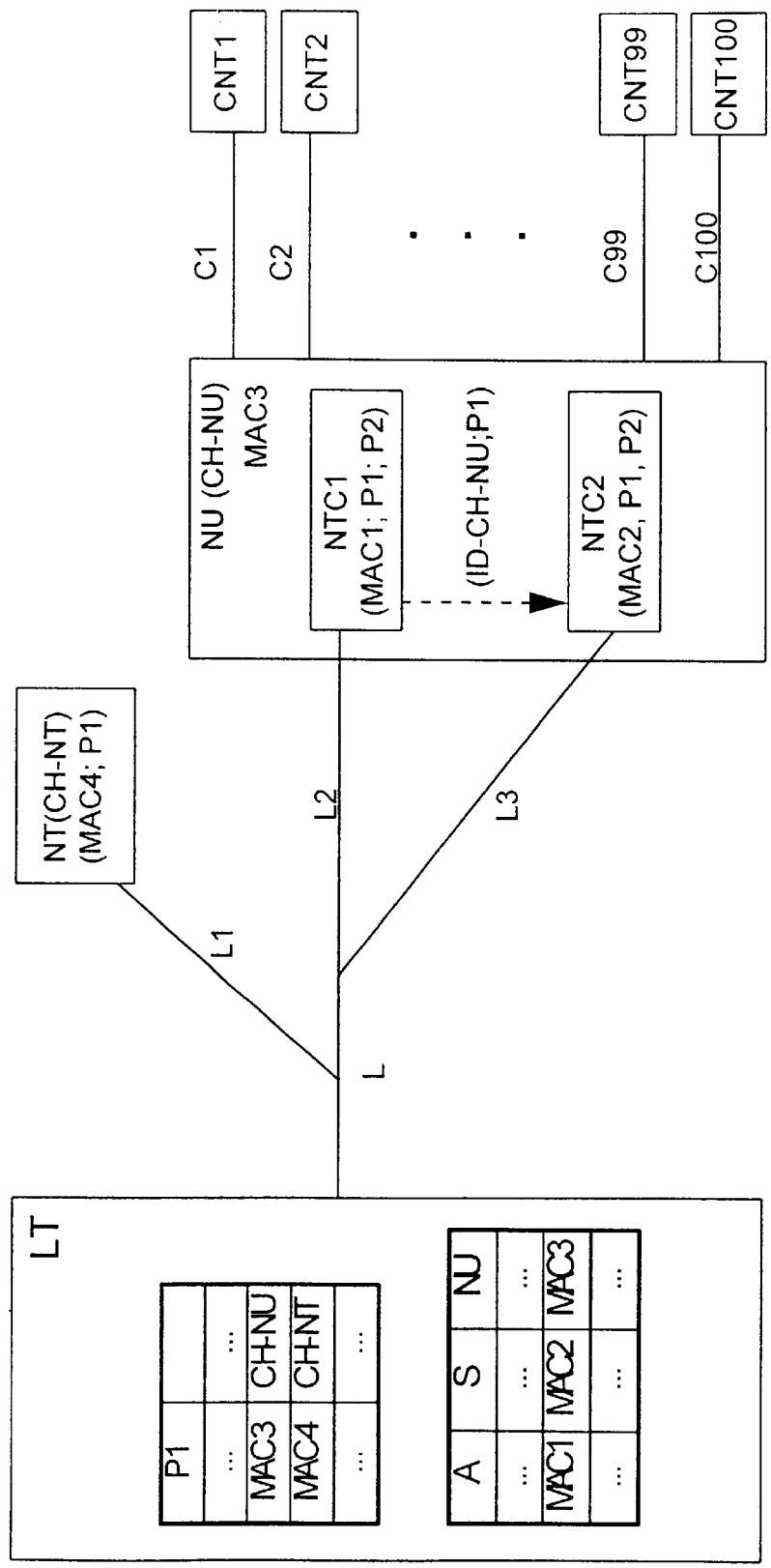
Figure

METHOD TO PROVIDE A MANAGEMENT CHANNEL, A LINE TERMINATOR, A FIRST NETWORK TERMINATOR CARD AND A SECOND NETWORK TERMINATOR CARD REALIZING SUCH A METHOD AND AN ACCESS NETWORK

BACKGROUND OF THE INVENTION

The present invention relates to a method to provide a management channel as described in the preamble of claim 1, a line terminator, a first network terminator card and a second network terminator card realizing the method as described in the preambles of claim 7, claim 8 and claim 9 and an access network as described in the preamble of claim 10.

Such a method to provide a management channel is already known in the art e.g. from the contribution of Italtel to the Full Service Access Network FSAN Requirements Specifications for "Management of Optical Network Terminations" from the 3rd of December 1997. This document clarifies the requirements for standardized management procedures of network terminations in a mixed Fiber To The Home FTTH and Fiber To The Cabinet FTTCa environment. The Access Node Management System needs to remotely and dynamically configure each Access Network element and access its status information in terms of fault and performance. As described on page 3 of this document, when an optical network unit has to be supported over the passive optical network and has to be fully configured, after completion of the ranging procedure, additional management configuration procedures have to be carried out. Such information, called hereafter management information, needs to be provided to an optical line terminator in order to enable the performance of management functions such as e.g. equipment deactivation, equipment fault reporting, user network interfaces, user network interface fault reporting, user network performance reporting, . . . . It has to be remarked that although in the cited document, as shown in the FIGURE of page 1, a distinction is made between an optical network terminator ONT and an optical network unit ONU, in the claims and this further description the terms are defined as follows: a network unit NU includes a termination of a network i.e. a network termination or a network terminator cord NTC. In an optical network such a network termination is called PON termination. Such a network unit NU supports e.g. one hundred customers or only one customer whereby in the latter case the integration of the network unit NU and the customer network terminator is called network terminator NT.

In order to transport the management information a management channel has to be provided and to be set up. On page 5 of the above document it is described to introduce in the Asynchronous Transfer Mode Passive Optical Network ATM-PON specification Transmission Convergence TC layer a Physical Layer Operation And Maintenance PLOAM message in order to activate a virtual channel connection as management communication channel between the optical line terminator and an optical network unit. It has to be remarked that Physical layer operation and maintenance cells PLOAM's are broadcasted in the network in order to transfer operation and maintenance information like e.g. alarm indication signal or bit interleaved parity check. Such PLOAM cells are described in the ITU-T Recommendation 1.610.

SUMMARY OF THE INVENTION

An objector the present invention is to provide a method for providing a management channel for use in a tree like access network of the above known type but which method is suited in case of redundant network terminator cards i.e. an active network terminator card and a stand-by network terminator card which are both included in one network unit.

According to the invention, this object is achieved with the method to provide a management channel as described in claim 1, and with the line terminator, the first network terminator card and the second network terminator card which are realizing the method as described in claim 7, claim 8 and claim 9 and the access network as described in claim 10.

Indeed, it has to be remarked that, following the above mentioned method of providing a management channel which makes use of a PLOAM cell, as e.g. one of the last steps of the ranging procedure, the line terminator determines for each PON termination a management channel. A straightforward evolution of this method in a tree like network with the cascade connection of one common link i.e. the root and dedicated links i.e. the branches, and with redundant network terminator cards in one physical location i.e. in one network unit, is that the line terminator card determines for each PON termination a management channel. This means that a first management channel for the first network terminator card is determined and a second management channel for the second network terminator card is determined.

However, in the event when a first network terminator card being the active network terminator card becomes in-active, due to e.g. an internal failure or a failure in its dedicated link, and a second network terminator card being the stand-by network terminator card becomes active, extra control resources are required in the line terminator to switch over from one management channel to another one. Indeed, the control resources are required in order to select and to control the use of the extra management channel for the second network terminator card. Moreover, extra bandwidth resources for an extra management channel is required before the bandwidth of the first management channel from the previous management channel can be released.

Accordingly the basic idea of the present invention, when the second network terminator card is using, in the event when it becomes active, the same management channel as the first network terminator card was using before when it was active, no extra bandwidth is required for the transportation of the management information and no extra resources are required in the line terminator in order to recognize or to control the second management channel. This unique management channel for the network unit which includes both network terminator cards is called hereafter and in the claims the network unit management channel. This network unit management channel transports the management information which is in fact related to the network unit itself and which is common for both network terminator cards. Indeed this management information includes e.g. information related to the internal communication system between the network terminator cards and the line interface modules or status information concerning these line interface modules which are providing the links towards the customers. Hence, the method of the present invention is suited for redundant network terminator cards which are included in one network unit of a tree like access network.

Another characteristic feature of the present invention is that the identifier information concerning the network unit management channel is provided by the line terminator to the first network terminator card, not following the above described prior art method with PLOAM's cells during one of the last ranging steps, but following a predefined metaprotocol and via a predefined metachannel. In this way, no intervention has to be made within a complicated procedure such as the ranging procedure e.g. delay ranging and power leveling, which makes use of already defined fields in the PLOAM cells. The network terminator card only has to know the references to this predefined metachannel which can e.g. be hard-coded. These references might be e.g. the virtual channel identifier and virtual path identifier of a point to multipoint ATM connection whereby a predefined request—answer procedure can be implemented between the network unit and the line terminator. This is described in claim 2.

It has to be remarked that it is obvious to a person skilled in the art that the line terminator has to know the following information: which network terminator card is the active network terminator card, which network terminator card is stand-by for which active network terminator card and in which network unit are both network terminator cards included. A possible way to provide such reference information is to preconfigure the line terminator with the configuration of the network. However, such a method has the disadvantage that possible changes to the configuration of the network requires adaptations to this preconfiguration. Therefor an additional feature of the present invention is described in claim 3. Following this method the reference information is provided by the network terminator card to the line terminator at a convenient time e.g. when the first network terminator card included in the network unit becomes active for the first time.

Also a feature of the present invention is that the method further includes the step of determining a management protocol according to management protocol information provided by the first line terminator card to the line terminator. Indeed, it has to be explained that the different kinds of management protocols can be implemented between a network unit and a line terminator. Since the management protocol between a network terminator, as defined in one of the above paragraphs, and a line terminator is a management protocol towards only one customer network terminator, it is expected not to be a complicated management protocol whereby standardization of this management protocol is feasible. On the other hand, the management protocol between a network unit which supports substantially 100 hundred customers is often a proprietary management protocol. But furthermore, it is possible that a network unit is able to support e.g. one or more proprietary management protocols and a standard management protocol. In the event when an network terminator card included in a network units provides to the line terminator the information concerning the different management protocols it is able to support, the line terminator determines based upon this information which management protocol the network terminator card has to follow. This is described in claim 4.

Yet another feature of the present invention is that in stead of defining only for network terminator cards, i.e. for PON terminations, an unambiguous unique identification address called media access control address, also defining for a network unit which includes one or more redundant pairs of active and stand-by network terminator cards an unambiguous unique identification address. This unambiguous unique identification address is called the media access control address of the network unit. By determining this media address control address, also the network unit management channel can be unambiguously identified by the line terminator. This is described in claim 5.

Still a further feature of the present invention is the way how the second network terminator card becomes aware of the identifier information of the network unit management channel. Since the line terminator determines the network unit management channel, a possible way to provide this identifier information to the stand-by optical network terminator card is via the line terminator. Such an implementation requires control signals between the standby optical network terminator card and the line terminator before its becomes active. However, claim 6 describes that the identifier information is provided by the active i.e. the first network terminator card to the stand-by i.e. the second network terminator card, which enables a future use of the network unit management channel without the above disadvantage.

It should further be noticed that the term "including", used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means .

BRIEF DESCRIPTION OF THE DRAWINGS

The above and other objects and features of the invention will become more apparent and the invention itself will be best understood by referring to the following description of an embodiment taken in conjunction with the accompanying drawing which shows a block scheme of a tree like access network wherein the method of the invention is used.

DETAILED DESCRIPTION OF THE INVENTION

Referring to the FIGURE the working of the tree like access network implementing the invention will be explained by means of a functional description of the blocks shown therein. Based upon this description, implementation of the functional blocks will be obvious to a person skilled in the art and will therefore not be described in detail. In addition, the principle working of the method of the invention will be described in further detail.

The tree like access network is an asynchronous transfer mode passive optical network, APON network with a mixed structure: Fiber To The Home FTTH and Fiber To The Cabinet FTTCa Network. This mixed structure is preferred in order to explain the proper working of the method of the invention in such a mixed network.

Referring to the FIGURE, the APON network includes: an optical line terminator LT, an optical network terminator NT supporting one customer and an optical network unit NU supporting one hundred customer network terminators CNT1, CNT2, . . . , CNT99, CNT100. It has to be remarked that in order not to overload the FIGURE only customer network terminators CNT1, CNT2, CT99, CNT100 are shown.

The optical line terminator LT is coupled via a common optical link L and an optical dedicated link L1 to the optical network terminator NT. The optical line terminator LT is coupled via the common link L and two dedicated links L2 and L3 to the optical network unit NU.

The optical network unit NU is coupled via one hundred individual copper links C1, C2, ..., C99; C100 (only C1, C2, C99, C100 are shown) to the one hundred customer network terminators CNT1, CNT2, ..., CNT99, CNT100. It has to be explained that to each customer network terminator one or more terminal equipments are coupled. However, the presence of these terminal equipments in the access network goes beyond the scope of this invention and they are therefor not shown in the FIGURE.

The optical network unit NU includes two optical network terminator cards NTC1 and NTC2 which are redundant for each other. Each optical network terminator card, NTC1 and NTC2, is coupled to the line terminator via one of the two dedicated links of the optical network unit i.e. L2 and L3, respectively. The first optical network terminator card NTC1 is defined as the active optical network terminator card and that second optical network terminator card NTC2 is defined as the stand-by optical network terminator card for the active optical network terminator card.

The optical network terminator NT and the first and second optical network terminator cards NTC1 and NTC2, respectively, are called hereafter shortly PON terminations.

It has to be remarked that the downstream signals in the tree like access network are distributed from the optical line terminator LT towards the PON terminations and that the upstream signals in the tree like access network are transmitted from one of the PON terminations towards the optical line terminator LT.

When a PON termination becomes active in the network a ranging procedure is executed. This means powerleveling and delay ranging procedures are fulfilled. Once these procedures are fulfilled it is important that the line terminator configures remotely and dynamically each active PON termination and collect its status information in terms of fault and performance. This status information is called hereafter management information. It has to be remarked that the functional block which gathers the management information is often called the access node management system which is either included in the optical line terminator or directly coupled to the optical line terminator. In order not to complicate the definitions in this further description of the embodiment it is decided to use the simple expression that management information has to be forwarded to the optical line terminator.

This management information has to be forwarded by the PON terminations to the optical line terminator in order to enable the line terminator to complete the management functions. The management information is provided via a predetermined communication channel called management channel and following a predetermined protocol called management protocol.

Before the management information can be provided via the management channel, it has to be understood that identifier information concerning the management channel has to be agreed between the line terminator and the PON terminations.

Since the network is dealing with ATM, the identifier information concerning the management channel is a unique combination of a virtual channel identifier with a virtual path identifier. In order not to intervene in a complicated ranging procedure which is established with already determined positions in a PLOAM cell structure it is preferred for this embodiment to provide the identifier information via a predefined metachannel following a predefined metaprotocol. It has to be remarked that another reason why this metaprotocol is used will become clear in a further paragraph. The predefined metachannel is identified by a predetermined combination of a virtual channel identifier called meta virtual channel identifier VCI-meta (not shown in the FIGURE) and a virtual path identifier called meta virtual path identifier VPI-meta (not shown in the FIGURE). These values are fixed i.e. hard-coded in the PON terminations. This means that the VCI-meta/VPI-meta, called hereafter shortly metachannel CH-meta, is predetermined information for the optical network terminator, for the first optical network terminator card and for the second optical network terminator card. The used meta protocol stack which is preferred to implement includes three messages i.e. one upstream message and two downstream messages. The content of some of these messages will in the following paragraph be explained in order to support a further paragraph which describes the principal working of the invention. However a description of each field of each message will not be described in further detail since this goes beyond the scope of the invention. The aim is that a request—answer protocol is established in order to request by the PON termination to the line terminator the identifier information concerning the to be used management channel and to determine and to provide by the line terminator to the PON termination this identifier information.

It has to be explained that in this particular embodiment it is preferred to define in the request for identifier information—message from the metaprotocol also the following information fields:

1. Reference information including one or more media access control addresses according to the type of newly installed PON termination:

for the optical network terminator NT: the media access control address of the optical network terminator which is MAC4; and for the optical network unit NU, it has to be remarked that due to this reference information from the optical network unit NU, the optical line terminator LT becomes aware of the association between the redundant optical network terminator cards and their optical network unit. The agreement in this request message from the meta protocol is as follows: the first mentioned media access control addresses is the MAC address from the active optical network terminator card e.g. the first optical network terminator card; the second mentioned media access control addresses is the MAC address from the stand-by optical network terminator card e.g. the second optical network terminator card and the third mentioned media access control addresses is the MAC address from the optical network unit itself which includes both redundant optical network terminator cards i.e. MAC3. Thus the field includes e.g. MAC1; MAC2; MAC3.

2. Management protocol information including the references to one or more management protocols supported by the PON termination. It has to be remarked here that the detailed working of the to be installed management protocols goes beyond the scope of the invention. The aim is that the references to the protocols which can be supported by a particular PON terminations are provided to the line terminator in to enable the line terminator to determine the protocol which must be supported during the present working of the PON termination. Presume that the optical network terminator NT supports only a first management protocol P1 and that the two redundant network terminator cards NTC1 and NTC2 are both supporting this first management protocol P1 and a second management protocol P2.

Once a request message from a PON termination is received by the optical line terminator, the optical line termintor has to execute the following actions:

1. Storing eventual reference information received from the PON termination e.g. MAC1; MAC2; MAC3. It is not the aim of this description to describe how such information can be stored. In order to show the fact that this information is stored at first table is shown in the FIGURE with three columns Active network terminator card: A column; Stand-by network terminator card: S column and associated network unit: NU column. Each row in the table is expressing by means of the MAC addresses a link between three devices following the above columns.

2. Determining the identifier information concerning the management channel to be used by the PON termination in order to transmit its management information : e.g. for the NT with MAC4: management channel CH-NT or for the NTC1 with MAC1 associated to MAC3: management channel CH-NU. It has to be understood that CH-NT and CH-NU each include in fact the references to the unique combination of a predefined virtual path identifier with a virtual channel identifier. But in order not to overload the FIGURE and this description it is preferred to mention CH-NT or CH-NU in order to refer to these unique management channels.

3. Determining the management protocol to be used by the PON termination: P1 or P2. It is preferred in this embodiment that the optical line terminator is only able to support the protocol P1. In this way, the optical line terminator will always choose protocol P1 in order to determine the to be used protocol by the PON termination. It has to be understood that when a PON termination only supports e.g. protocol P2 and this also includes in its request message of the metaprotocol, that the optical line terminator has to provide a via this metaprotocol a rejection message.

4. The above determined information is stored by the optical line terminator. It is not the aim of this description to describe how such information can be stored. In order to show the fact that this information is stored at second table is shown in the FIGURE. This protocol P1 table includes two columns a first column for the reference to the PON termination which includes its MAC address and a second column for the identifier information concerning its management channel.

When the optical line terminator has finished the above actions, the optical line terminator provides a confirmation message to the concerned PON termination. This confirmation message includes the reference to the PON termination i.e. its MAC address, the determined identifier information and the determined management protocol to be used by the PON termination.

When the PON termination includes redundant optical network terminator cards, as it is the case for the optical network unit of this preferred embodiment, the active optical network terminator card has to realize, once it is active and once it received from the optical line terminator its identifier information concerning the to be used management channel and its protocol to be supported, still one message. Indeed, the active network terminator card needs to provide this identifier information and the management protocol information to the stand-by network terminator card. The forwarding message of the identifier information of the management channel e.g. ID-CH-NU and the management protocol e.g. P1 is shown in the FIGURE with the arrow from the first network terminator card NTC 1 to the second network terminator card NTC2. It has to be remarked that the forwarding message not necessarily needs to be performed just after receiving the identifier information from the line terminator but that can wait for a convenient time to send this message.

It has to be remarked that in the event when a failure occurs e.g. the active network terminator card fails or a link between the active network terminator card and the line terminator fails, the stand-by network terminator becomes active. It is know to a person skilled in the art that such a situation needs to be detected and controlled like e.g. updating of the first table in the optical line terminator or informing the stand-by network terminator card that it is now the active one. However it is not the aim of this description to describe here in detail all needed control signals in order to re-establish the situation. It is presumed for this embodiment that once a failure occurs which involves the proper working between the active network terminator card and the line terminator, that the failure is detected, that the active optical network terminator becomes in-active and that the stand-by optical network terminator becomes active.

In the event when the stand-by network terminator card becomes active its starts to transport the management information following the received identifier information of the management channel and following the received management protocol. By this way the second reason of not having the metaprotocol as part of the ranging procedure becomes clear. Indeed, having the metaprotocol as part of the ranging procedure is not feasible since the ranging protocol deals with PON terminations which does not align with the use of only one optical management channel in case of optical network units with redundant optical network terminator cards in a tree like access network.

In order to explain now the principle working of the present invention the different steps of three situations of an example will be explained.

The example includes the following situations:

a) The optical network unit NU becomes active which means that in fact its first network terminator card NTC1 becomes in the active mode and its second network terminator card NTC2 in the stand-by mode;

b) The optical network terminator NT becomes active;

c) The dedicated link L2 of the first optical network terminator card fails whereby it becomes inactive and the second optical network terminator card becomes active.

The three situations are including the following steps and actions, however not necessarily executed in a consecutive way:

a)—Request message by NTC1 to LT via the CH-meta and including (MAC1; MAC2; MAC3; P1; P2);

Determining by LT the management channel CH-NU for NTC1;

Determining by LT the management protocol P1 for NTC1;

Confirmation message by LT to NTC1 via the CH-meta and including (MAC1; P1; CH-NU);

Transportation of management information of NU by NTC1 to LT via CH-NU following P1;

Forwarding message by NTC1 to NTC2 including (ID-CH-NU; P1);

b)—Request message by NT to LT including (MAC4; P1);

Determining by LT the management channel CH-NT;

Determining by LT the management protocol P1;

Confirmation message by LT to NT including (MAC4; P1; CH-NT);

c)—Transportation of management information of NU by NTC2 to LT via CH-NU following P1;

Moreover it should be noted that although the above described embodiment includes an optical network terminator which includes no redundant terminator cards, the application of the present invention is not restricted to optical network terminators with only one terminator card. Indeed, small modifications, evident to a person skilled in the art, may be applied to the above described embodiment to adapt it to integrate the method of the invention in a network terminator, although dedicated to only one customer, but with two redundant terminator cards.

A further remark is that although the above described embodiment includes only one common link L, the application of the invention is not reduced to tree like networks which include only one common link. Indeed, small modification, evident to a person skilled in the art, may be applied to the above described embodiment to adopt it to integrate the method of the invention in a tree like network with more than one common link like e.g. a stand-by link in case of failure on this first common link.

Yet, another remark is that although the above described embodiment includes only one tree structure, the application of the present invention is not reduced to access networks which include only one tree structure. Indeed, small modifications, evident to a person skilled in the art, may be applied to the above described embodiment to adapt it to integrate the method of the invention in a network which includes more than one tree structure.

Although the above description of the present invention is explained in an asynchronous transfer mode passive optical network, the application of the present invention is not limited to such a network. Indeed, small modifications evident to a person skilled in the art, may be applied to the above described embodiment in order to adapt it to other tree like access networks with the cascade connection of a common link and dedicated links.

While the principles of the invention have been described above in connection with specific apparatus, it is to be clearly understood that this description is made only by way of example and not as a limitation on the scope of the invention, as defined in the appended claims.

What is claimed is:

1. A method to provide a management channel for use in a tree like access network including a cascade connection of a common link and three dedicated links, said access network including a line terminator and a network unit, said method comprising:
   determining by said line terminator, a network unit management channel for a first network terminator card included in said network unit and coupled to said line terminator via said common link and a first one of said dedicated links, in order to transport management information from said first network terminator card to said line terminator; and
   in the event that a second network terminator card, being redundant to said first network terminator card, becomes active, transmitting over said network unit management channel assigned for both said first and said second network cards, said management information from said second network terminator card to said line terminator;
   said second network terminator card being included in said network unit and being coupled to said line terminator via said common link and a second one of said dedicated links, said management information being related to said network unit.

2. The method to provide a management channel according to claim 1, further comprising providing identifier information concerning said network unit management channel by said line terminator to said first network terminator card following a predefined metaprotocol and via a predefined metachannel.

3. The method to provide a management channel according to claim 1, comprising providing reference information by said first network terminator card to said line terminator, said reference information determining said second network terminator card being redundant for said first network terminator card and both included in said network unit.

4. The method to provide a management channel according to claim 1, comprising determining a management protocol according to management protocol information provided by said first network terminator card to the line terminator, said management protocol being supported to complete management functions based upon said provided management information.

5. The method to provide a management channel according to claim 1, comprising in the determining of said network unit management channel, identifying by said line terminator unambiguously said network unit management channel, based on the media access control address of said network unit.

6. The method to provide a management channel according to claim 1, said method further comprising providing by said first network terminator card to said second network terminator card identifier information of said network unit management channel in order to enable usage of said network unit management channel by said second network terminator card.

7. The method to provide a management channel according to claim 1, wherein said determining of said network unit management channel includes unambiguously identifying, by said line terminator, said network unit management channel based on the identification address of said network unit.

8. A line terminator configured for a tree like access network including a cascade connection of one common link and dedicated links, said access network including a network unit, said line terminator comprising:
   a determining module configured to determine a network unit management channel to transport management information to said line terminator from a first network terminator card and a second network terminator card, included in said network unit, wherein said first network terminator card is coupled to said line terminator via a first one of said dedicated links and said common link; and
   a receiver configured to receive said management information via said network unit management channel;
   wherein in the event that said second network terminator card, being coupled to said line terminator via the common link and one of said dedicated links, and being redundant to said first network terminator card, becomes active said line terminator receives via said receiver from the second network terminator card via said determined network unit management channel said management information, being related to said network unit.

9. A tree like access network comprising the cascade connection of one common link and dedicated links, wherein said access network includes a line terminator according to claim 8.

10. First network terminator card for a network unit included in a tree like access network comprising a cascade connection of one common link and dedicated links, said first network terminator card comprising:
   first transmitting means to transmit management information to a line terminator via a network unit management channel, said line terminator being coupled to said first network terminator card via said common link and a first one of said dedicated links, said network unit management channel being determined by said line terminator, wherein said first network terminator card includes second transmitting means to transmit identifier information concerning said network unit management channel to a second network terminator card being redundant for said first network terminator card, and to thereby enable said second network terminator card to use said network unit management channel for transporting of said management information to said line terminator in the event when said second network terminator card being included in said network unit and being coupled to said line terminator via a second one of said dedicated links and said common link.

11. A tree like access network comprising the cascade connection of one common link and dedicated links, wherein said access network includes a first network terminator card according to claim 10.

12. A second network terminator card for a network unit included in a tree like access network comprising a cascade connection of one common link and three dedicated links, said access network also including a first network terminator card being included in said network unit and being coupled to said line terminator card via a first one of said dedicated links and said common link; and said second network terminator card including a transmitter configured to transmit management information via a network unit management channel to said line terminator coupled to said second network terminator card via said common link and a second one of said dedicated links wherein, said line terminator assigns said network unit management channel for transmitting management information from said first network terminator card to said line terminator in the event said first network terminator card is active and from said second network terminator card to the line terminator, in the event that said second network terminator card, being redundant to said first network terminator card, becomes active.

13. A tree like access network comprising the cascade connection of one common link and dedicated links, wherein said access network includes a second network terminator card according to claim 12.

14. A method of providing a management channel, in a tree like access network, comprising:

determining, by using a line terminator, a network unit management channel for a first network terminator card included in a network unit, wherein the network unit management channel transports management information from said first network terminator card to said line terminator, wherein said first network terminator card is coupled to said line terminator via a common link, and wherein said first network terminator card is coupled to a first dedicated link;

activating a second network terminator card when said first network terminator card is inactive;

using said network unit management channel to transport said management information from said second network terminator card to said line terminator when said first network terminator card is inactive, wherein said second network terminator card is in said network unit and is coupled to said line terminator via said common link and a second dedicated link; and providing, by said first network terminator card to said second network terminator card, identifier information of said network unit management channel to enable said using of said network unit management channel by said second network terminator card.

15. A method of providing a management channel, in a tree like access network, comprising:

determining, by using a line terminator, a network unit management channel for a first network terminator card included in a network unit, wherein the network unit management channel transports management information from said first network terminator card to said line terminator, wherein said first network terminator card is coupled to said line terminator via a common link, and wherein said first network terminator card is coupled to a first dedicated link;

activating a second network terminator card when said first network terminator card is inactive; and transporting over said network unit management channel determined for said first network terminator card, said management information from said second network terminator card to said line terminator when said first network terminator card is inactive, wherein said second network terminator card is in said network unit and is coupled to said line terminator via said common link and a second dedicated link.

16. A method of providing a management channel, in a tree like access network, comprising:

assigning, by using a line terminator, a network unit management channel for a first network terminator card included in a network unit, wherein the network unit management channel transports management information from said first network terminator card to said line terminator, wherein said first network terminator card is coupled to said line terminator via a common link, and wherein said first network terminator card is coupled to a first dedicated link;

activating a second network terminator card when said first network terminator card is inactive;

transporting over said network unit management channel assigned for said first network terminator card and said second network terminator card, said management information from said second network terminator card to said line terminator, when said first network terminator card is inactive, wherein said second network terminator card is in said network unit and is coupled to said line terminator via said common link and a second dedicated link; and identifying, by said line terminator, said network unit management channel based on the identification address of said network unit.

17. A tree like access communications network system comprising:

a network unit having network terminator cards including a first and a second network terminator card; and a network unit management channel for transporting management information between said network terminator cards and a line terminator, wherein said first network terminator card provides identifier information of said network unit management channel to said second network terminator card for enabling said second network termination card to use said network unit management channel when said first network termination card is inactive.

18. A tree like access communications network as defined in claim 17, wherein said first network terminator card further comprises transmitting means for transmitting management information to said line terminator via said network unit management channel.

19. A tree like access communications network as defined in claim 17, wherein said second network terminator card further comprises transmitting means for transmitting management information via said network unit management channel to said line terminator.

20. A tree like access communications network system comprising:

a network unit having network terminator cards including a first and a second network terminator card; and a line terminator assigning a network unit management channel for transporting management information between said line terminator and said network unit;

wherein when said first network terminator card is active and said second network terminator card is inactive, said first network terminator card uses said assigned network management channel for transporting the management information between said network unit and said line terminator and when said first network terminator card is inactive and said second network terminator card becomes active, said second terminator card uses said assigned network management channel for transporting the management information between said network unit and said line terminator.

21. The tree like access communications network system according to claim 20, wherein said line terminator associates the first network card and the second network card to said network unit.

22. The tree like access communications network system according to claim 21, wherein said network unit, said first network card and the second network card, each have a media access control address and wherein said line terminator associates the media access control address of the first network card and the media access control address of the second network card to the media access control address of said network unit.

* * * * *